(12) United States Patent
Meynerts et al.

(10) Patent No.: US 8,444,746 B2
(45) Date of Patent: May 21, 2013

(54) BRIQUETTING OF MILL SCALE

(75) Inventors: Udo Meynerts, Mulheim a. d. Ruhr (DE); Michael Maurer, Leichlingen (DE); Saulo Henrique Freitas Seabra Da Rocha, Herzogenrath (DE); Christian Wirtgen, Loutzen (BE)

(73) Assignee: RHM Rohstoff-Handelsgesellschaft mbH (DE)

( * ) Notice: Subject to any disclaimer, the term of this patent is extended or adjusted under 35 U.S.C. 154(b) by 321 days.

(21) Appl. No.: 12/841,876

(22) Filed: Jul. 22, 2010

(65) Prior Publication Data
US 2012/0017725 A1    Jan. 26, 2012

(51) Int. Cl.
*C22B 1/24*    (2006.01)
*C22B 1/248*    (2006.01)

(52) U.S. Cl.
USPC ............................. 75/772; 75/962; 23/313 R

(58) Field of Classification Search
USPC ................................. 75/772, 962; 23/313 R
See application file for complete search history.

(56) References Cited

U.S. PATENT DOCUMENTS

| | | | | |
|---|---|---|---|---|
| 4,075,027 A | * | 2/1978 | Knill et al. | 106/643 |
| 4,585,475 A | * | 4/1986 | Fosnacht | 75/544 |
| 5,833,735 A | * | 11/1998 | Grandin et al. | 75/544 |
| 6,802,886 B2 | * | 10/2004 | Hoffman et al. | 75/484 |

\* cited by examiner

*Primary Examiner* — George Wyszomierski
*Assistant Examiner* — Tima M McGuthry Banks
(74) *Attorney, Agent, or Firm* — Berliner & Associates

(57) ABSTRACT

The invention relates to a method for the agglomeration of iron-oxide-containing residual materials, in particular scale and mill scale, wherein the residual materials and paper sludge are dried and ground and agglomerates are produced, by hot briquetting, from a mixture of the residual materials and paper sludge so processed. In this manner, it is possible to produce mill scale briquettes of high strength and density. These briquettes can then be charged into an electric arc steelmaking furnace for the purpose of recycling the iron contained in the residual materials.

14 Claims, No Drawings

BRIQUETTING OF MILL SCALE

The invention relates to a method for the agglomeration of iron-oxide-containing residual materials.

In the steelmaking process, various residual materials are generated which often contain significant quantities of valuable materials, in particular iron in the form of iron oxides. Such iron-oxide-containing residual materials are, for instance, filter dusts from steel plants and blast furnaces, sludges from gas purification processes and, in particular, scale or mill scale. Scale is the material loss which occurs in metal treatment operations; it forms on the metal surfaces due to the action of oxygen at high temperatures. Mill scale, for example, is composed of oxide layers forming in steel rolling or forging operations as well as in wire drawing operations. Similar waste is generated also in the continuous casting process. The scale layer impairs the rolling process, which is the reason why it is usually removed by high-pressure water jet cleaning. The wastewater containing the fine-grained mill scale collects in a scale pit located beneath the rolling stand. Here, a sludge settles out, which contains—besides the metal oxide and water—also other impurities, in particular grease and oil.

Scale or mill scale mostly has a high iron content of approx. 70%. The iron is composed of a mixture of different iron oxides in the form of FeO (60 to 66%), $Fe_3O_4$ (30 to 34%), and $Fe_2O_3$ (2 to 5%). In addition, the mixture contains small quantities of nonferrous metal oxides and silicon dioxide.

In Germany, steelmaking processes generate an average of 56.2 kg of residual material per ton of crude steel. 61.2 kg per ton of crude steel is generated in the basic oxygen process route and 37.6 kg per ton of crude steel arises in the electric arc process route. ("Institut für Baustoff-Forschung," FEhS, 2005). The residual materials have the following compositions:

| Process Route | Blast Furnace | Electric Arc Furnace |
| --- | --- | --- |
| Total residual materials | 61.2 kg/$t_{crude\ steel}$ | 37.6 kg/$t_{crude\ steel}$ |
| Filter dusts | 39.9 kg/$t_{crude\ steel}$ | 20.7 kg/$t_{crude\ steel}$ |
| Sludges | 6.1 kg/$t_{crude\ steel}$ | — |
| Scale | 10.9 kg/$t_{crude\ steel}$ | 10.5 kg/$t_{crude\ steel}$ |
| Mill scale sludge | 4.3 kg/$t_{crude\ steel}$ | 6.5 kg/$t_{crude\ steel}$ |

In the past, residual materials from steelmaking operations were often deposited in landfills, but this disposal option is problematic from an ecological point of view and in light of the increasingly stringent environmental regulations. Given the situation in Germany, where the landfill capacity (both underground and above ground) is legally restricted and finite, landfill disposal is only a limited transitional solution, which will not be available in the long term. Moreover, a large share of the mill scale goes to the cement industry. However, due to the high iron content of the residual materials, the option of recycling such residual materials, such as scale and mill scale, is attractive also from an economic perspective.

Using sintering facilities for recycling residual materials is basically possible. However, in regard to mill scale in particular, there is a problem in that the residual oil content admissible for sintering plants is less than 0.3% w/w. Otherwise there would be danger of a smoldering fire occurring in the electric filter. For this reason, mill scale having a high residual oil content cannot be directly processed in a sintering plant. Primary de-oiling in a rotary furnace is a feasible solution, but a more desirable option would be to feed the residual materials directly back into the steelmaking process by charging them into the electric furnace.

It is not possible, however, to directly recycle the mill scale into the electric arc steelmaking furnace, as the iron oxide particles would be discharged with the waste gas or add to the amount of slag, which would have an adverse effect on energy consumption and the environment. For this reason, advance agglomeration of the residual materials in a briquetting or pelletizing process is called for along with the addition of a carbon carrier or reducing/binding agent. Various processes for briquetting scale and mill scale using, for example, cement (DE 23 60 595), lime hydrate and molasses (EP 0 630 980 A1) or silicates (WO 98/40523 A1) are known from prior art. It has turned out, however, that briquettes made in this manner are insufficient in strength. But adequate strength is of major importance for agglomerates that are intended to be used in the electric arc furnace to make sure that they penetrate deep into the process or melt, which means that, even at high temperatures, the agglomerates must be capable of resisting the temperature shock and the mechanical stresses occurring upon contact with the unmolten scrap so that they may reach the steel melt in an as intact condition as possible. The agglomerates must be of such a nature that they can penetrate the slag layer that floats on the surface of the steel melt. Otherwise, an early collapse of the agglomerates into a dust-like state would lead to an increase in the waste gas dust load and/or the amount of slag. In addition, high strength is also an advantage as it makes sure that the agglomerates can withstand other strains as well, in particular the rigors involved in handling, storing and charging the agglomerates into the electric arc furnace. Furthermore, the binders used in the agglomeration process must not negatively impact either the steel melt or the slag layer. Finally, it is important to ensure that, if ever possible, no harmful substances are released during the agglomerate melting process.

It is advantageous for the agglomerate to have a high density (possibly >2.2 $g/cm^3$) so that they can pass through the slag down to the surface of the steel melt. On the surface or in the surface layer, the agglomerates should impart their metallic portions to the melt as directly as possible.

A method is known from U.S. Pat. No. 2,865,731 which uses cellulose material for briquetting finely distributed iron oxide from hematite washing processes. This method typically uses 12 to 18 US pounds of cellulose fibers per ton of fine iron oxide. It has turned out, however, that briquettes produced in this manner do not have the properties required for agglomerates that are to be recycled into the steelmaking process with the help of an electric arc furnace.

Starting from the prior art described above, the objective is to provide a method for producing agglomerates from iron-oxide-containing residual materials with the help of which agglomerates can be produced that have sufficient strength to make them suitable for recycling via an electric arc furnace.

Surprisingly enough, it has been found out that such agglomerates, made from iron-oxide-containing residual materials, can be produced by a method in which paper sludge—and also the residual material, as the case may be—are ground and a mixture of dry residual materials and dry paper sludge is briquetted at a temperature of between 70 and 350° C., with the water content of the dry residual materials and the paper sludge being less than 5% w/w and the mixture containing 15 to 35% w/w dry paper sludge.

The investigation of different binders has revealed that various conventional binders do not have the required properties. A binder which has proved to be especially suitable is paper sludge, i.e. fiber material with a cellulose base. It is an indispensable requirement, however, that the water content of the paper sludge be reduced to a low level prior to the briquetting process, as it has turned out that an excessive water content affects the compacting process in a significant manner. In this description, the terms "dry paper sludge" and "dry residual materials" are to be understood as meaning paper sludge and residual materials having a low water content of less than 5% w/w; complete removal of the water is usually neither necessary nor possible.

Paper sludge as delivered has a typical water content of approx. 57% w/w, and the iron-oxide-containing residual materials often have an unacceptable water level as well, especially if the residual materials are scale or mill scale, which has an average water content of approx. 5% w/w. The paper sludge and the residual materials, as the case may be, can be dried, for example at a temperature of 85° C. over a period of 24 hours. During drying, the paper sludge forms into a flocculent material paper sludge which must be further ground. Moreover, grinding the residual materials themselves is often advisable as well.

Surprisingly, it has turned out that the hot briquetting method according to the invention increases the stability of the agglomerates in a substantial way. The briquettes were tested for strength using the so-called Brazilian test which is designed for testing cylindrical specimens. This test method permits briquettes of different dimensions and different slenderness (height-to-diameter ratio) to be compared. The test serves to determine the splitting tensile strength. A tensile strength $\sigma_{bz}$ of 3.2 MPa was measured for the briquettes produced by hot briquetting. Moreover, the briquettes so produced exhibit a sufficiently high density of more than 2.5 g/cm$^3$.

Similar tests were made with other binders for comparison. The tests revealed that briquettes containing 10% cement have a maximum splitting tensile strength of only 0.1 to 0.4 MPa after a curing period of 28 days, which must be considered as insufficient. In addition, the briquettes must be self-reducing, i.e. they should contain enough reducing agent to ensure that, in the recycling process, a maximum portion of the iron oxide in metallic condition is transferred to the steel melt. Where cement is used as a binder, it is necessary to add an additional reducing agent, e.g. charcoal or coke breeze, to make the mixture self-reducing. This leads to a further reduction of the splitting tensile strength, however.

One potential reason for the poor results obtained with cement could be the fact that this binder as well as the required water content leads to further oxidation of the iron, for example oxidation of FeO into $Fe_2O_3$ or formation of hydrates, such as goethite. The new oxidation stage and the hydrates weaken the bond between the cement and the surfaces of the residual material particles, which leads to a reduction in strength.

The use of lime hydrate as a binder yielded poor results as well. After a curing period of 28 days the strength was as low as 0.3 to 0.5 MPa. In addition, the briquettes showed an insufficient density of approx. 1.1 g/cm$^3$. The addition of molasses to the lime hydrate did not significantly increase the strength of the briquettes.

The use of volclay did not lead to briquettes of sufficient strength either. With 5 and 10% w/w volclay, the strength was 0.60 MPa and 0.90 MPa respectively. Long-time curing did not bring about any significant improvement. As in the case of cement, the cause is deemed to be further oxidation of iron oxide.

As already mentioned, the iron-oxide-containing residual materials within the meaning of the invention are, in particular, scale and mill scale of the type generated during the continuous casting and rolling of steel or in other processes. While the term mill scale is used hereinafter, it should be noted that, within the meaning of this invention, this term is to be understood as covering all types of scale/mill scale. As mill scale is usually removed from the metal surface with a high-pressure water jet (250 to 280 bar), it usually has a high initial water content of approx. 5% w/w. The briquetting properties can be significantly improved by drying.

Drying is also of major importance where untreated paper sludge having a typical water content of approx. 57% w/w is used. After being dried, the paper sludge is a flocculent material with a grain size of <20 mm. Both the dried paper sludge and the dried iron-oxide-containing residual materials are required to have a water content of less than 5% w/w. Where treated paper sludge is used, from which the major share of the water has been removed, additional drying may not be necessary.

The dried and ground paper sludge and the iron-oxide-containing residual materials, which have usually undergone also a drying and grinding process, are mixed to form a mixture containing 15 to 35% w/w dried paper sludge. Good results in terms of strength can be achieved with a paper sludge share of more than 20% w/w or more than 26% w/w, as the case may be.

Where the paper sludge used was dried, but not ground, it was observed that the sludge underwent segregation during the mixing process with the iron-oxide-containing residual materials. Such segregation problems can be minimized by grinding the paper sludge flakes. Grinding should be done in a manner to ensure that 90% w/w of the dried and ground paper sludge has a grain size of less than 1 mm.

The iron-oxide-containing residual materials, and the mill scale in particular, should be ground as well. Mill scale, in its original form, has a relatively wide grain size range with 50% w/w of it being larger than 0.7 mm. The big particles are very brittle and constitute the weakest points of the agglomerates, for it is here that cracks and breaks originate. It has turned out that briquettes made using finer mill scale, with all other briquetting parameters remaining unchanged, showed twice the strength of briquettes formed from untreated mill scale. The residual materials should be ground to such a degree that 90% w/w of the residual material in the mixture has a grain size of less than 1 mm. Ideally, less than 5% w/w of the residual materials should have a grain size of more than 1 mm. Depending on the circumstances, grinding the residual materials and the paper sludge down to a maximum particle size of 2 mm may be sufficient.

The use of a ball mill or a vibration mill has turned out to be especially advantageous for grinding the residual materials and the paper sludge, the preferred grinding process being one in which these components and may be further components, as the case may be, are simultaneously mixed and ground. It has turned out that the residual materials can be advantageously pressed into the fibers in this manner. Segregation of the components is thus effectively prevented. Otherwise—given the significant difference in density between the residual materials on the one hand and the paper fibers on the other hand—segregation may be expected to occur prior to briquetting. Segregation must be avoided, however, in order to ensure that the briquettes have a sufficient level of strength.

A ball mill is a horizontally arranged rotary drum, in which the feed material moves jointly with wear-resistant grinding elements. The feed material lodged between the grinding elements is crushed by impact. The grinding elements used may be balls, cylindrical elements or pebbles; it has turned that the best results are obtained with cylindrical grinding elements. The same applies to the use of vibration mills, in which the grinding elements inside the container exert force on the feed material as the container is made to execute a vibratory motion.

According to an especially preferable embodiment, the operations carried out in the ball or vibration mill are not restricted to mixing and grinding the residual materials and the paper sludge, but include also the operations of drying and, as the case may be, preheating the mixture prior to the hot briquetting process. As a result, only two devices are required for the process covered by the invention, namely the ball mill or vibration mill, which serves for drying, mixing, grinding and preheating, and the briquetting press, which serves for the briquetting operation proper.

However, the grinding of the residual materials and the paper sludge can be performed also in a hammer mill or cutting mill or by other means known to those skilled in the art. Grinding and mixing are preferably carried out in one operation, but grinding the residual materials and the paper sludge may also be done as a separate operation that is performed prior to the actual mixing operation.

Surprisingly enough, it has turned out that the method covered by the invention is also suitable for forming agglomerates from residual materials containing iron oxide and oil, in particular mill scale, without causing non-tolerable negative effects on strength. The oil content may be 5 to 10% w/w maximum, related to the residual materials. As mentioned at the outset, oil contained in mill scale is a big problem in sintering processes. Moreover, in the production of briquettes using other binders, such as cement, the oil content has also an adverse effect on the strength of the agglomerates.

Briquetting, i.e. the production of agglomerates—where term "agglomerates" within the meaning of the invention is to be understood to cover not only briquettes but also pellets, for example—is performed as a hot briquetting operation that takes place advantageously at temperatures of between 90 and 250° C., in particular between 90 and 150° C. Briquetting operations performed at a temperature of approx. 140° C. showed no agglutination problems and turned out to be advantageous. The most preferable temperature range is thus comprised between 130 and 150° C. The agglomerates may have a diameter of between 20 and 50 mm, for example.

Moreover, pressure is applied during the briquetting operation, the pressure level being comprised between 10 and 500 MPa, preferably between 30 and 350 MPa and especially preferably between 100 and 200 MPa. Satisfactory results were obtained applying a pressure of approx. 150 MPa.

Heating the mixture during the hot briquetting process may be done in different ways, for example with a stream of inert gas, steam, hot air, or a mixture of air and inert gas. Heating by heat transfer, either by direct contact or radiation, is also possible.

One or several additional binders may be added to the mixture to be briquetted, such as liquid binders that are stable at elevated temperatures, such as sodium silicate (water glass) or aluminum phosphate. It is also possible to add liquid binders for the purpose of preventing segregation. Examples of such binders are molasses or spent sulfite solution. Another option is the addition of an inorganic binder to support desulfurization. Such binders are, for instance, lime hydrate or calcined lime. Small quantities of mineral binders may help to improve high temperature resistance. Binders should be added in quantities of 1 to 10% w/w, related to the total mass of the mixture.

Further materials of the type used in the manufacture of alloys may be added to the briquetting mixture intended for the production of the agglomerates. The quantities to be added are governed by the desired composition of the steel to be produced using the agglomerated iron-oxide-containing residual materials. The following materials may be added in quantities of up to 90% w/w, related to the iron-oxide-containing residual materials:

Aluminum
Copper
Manganese
Magnesium
Silicon
Silicon carbide (SiC)
Ferrochrome (FeCr)
Ferromanganese (FeMn)
Ferrophosphorus (FeP)
Ferrosilicon (FeSi)
Ferrosilicon magnesium (FeSiMg)
Ferrotitanium (FeTi)
Chromium
Nickel
Ferronickel
Molybdenum
Ferromolybdenum
Cobalt
Ferro-cobalt
Zinc oxide
Zirconium
Tungsten
Vanadium
High-speed steel (HSS) powder Apart from the iron-oxide-containing residual materials, further metal-containing components may be added, such as steel chips, cast steel chips, and/or residual materials from smelting operations. Residual materials from smelting operations include, for example, HBI (Hot Briquetted Iron) fines or DRI (Direct Reduced Iron) fines. HBI fines are residual materials from larger ore lumps which are hot-briquetted. Moreover, metal-containing composite packaging materials, in particular composite packaging materials consisting of metal and cardboard/paper, can be added. Such composite materials may be, for example, ground beverage packaging containers of the type known as Tetra Pak® or Tetra Brik®. These containers consist of aluminum-foil-coated cardboard. It goes without saying that these additional materials need to be ground and mixed with the other components prior to briquetting. Where paper-containing composite packaging materials are used, it should be taken into account that the paper contained in those material adds to the overall paper content, so that the quantity of paper sludge added may have to be reduced accordingly. Additional metal-containing components may be added up to a share of 90% w/w, related to the iron-oxide containing residual materials.

Besides the above mentioned advantages in terms of strength and density of the agglomerates produced with the addition of paper sludge, a further benefit of using paper sludge is the low price of paper sludge, as it is a waste product which is generated in large quantities in paper recycling processes. Furthermore, the paper sludge makes sure that the agglomerates are self-reducing to some extent, so that, in the recycling operation, a large share of the iron oxide is transferred to the steel melt in a metallic condition.

In addition to the above described method, the invention relates also to an agglomerate, in particular a briquette or pellet, which can be produced by the method provided by the invention.

Furthermore, the invention relates to the use of the agglomerates in the steel making process, where the agglomerates are charged into an electric furnace, in particular an electric arc furnace. It is also conceivable that the agglomerates are used in an induction furnace, a BOF/LD converter, a blast furnace, a shaft furnace, a cupola furnace or a treatment container, e.g. a ladle. In this manner, the valuable materials contained in the residual materials, i.e in particular iron present as iron oxide, are recycled into the steelmaking process.

EXEMPLARY EMBODIMENT

Mill scale (water content: 5% w/w) and paper sludge (water content: 57% w/w) were dried in a cabinet drier at a temperature of 85° C. for 24 hours. In this manner, the water content of each of the two components was reduced to less than 5% w/w. After drying, the paper sludge was a flocculent material having a grain size of less than 20 mm.

Subsequently, the flocculent paper sludge and the mill scale were crushed using a hammer mill, after which process 90% w/w of both components—the mill scale and the paper sludge—had a grain size of less than 1 mm.

The dried and ground mill scale and paper sludge were then mixed in a ratio of 80 to 20% w/w. The mixture was placed in a cylindrical mold for hot briquetting. The briquetting process was performed at a pressure of 150 MPa and a temperature of 140° C. The briquettes produced were tested for strength (splitting tensile strength) using the Brazilian Test. The briquettes produced had a strength of 3.2 MPa and a density of >2.5 g/cm$^3$.

High Temperature Resistance

The above mentioned briquettes were tested for strength under high-temperature conditions. At a load of 1 MPa, the briquette retains its original shape up to a temperature of approx. 1,000° C. From this temperature upward, the briquette gets deformed, retaining its integrity as an agglomerate, however. It does not generate dust and it does transfer the valuable iron units into the deeper section of the metallurgical reactor.

Melting Performance

The briquettes produced (800 g) and the C45 steel ingots (4,000 g) were heated in an induction furnace and melted. The briquettes survived the heating process. The iron oxide was reduced to metallic iron and dissolved in the metal melt. The melt was poured into a mold for cooling. The chemical composition of the metal ingot showed no increase in undesirable elements (e.g. sulfur, copper, tin).

The invention claimed is:

1. A method for the agglomeration of iron-oxide-containing residual materials, wherein paper sludge and, optionally, the residual materials are ground and a mixture of the residual materials and the paper sludge is briquetted at a temperature of between 70 and 350° C., the mixture prior to briquetting either having less than 5% w/w or is dried to less than 5% w/w and contains 15 to 35% w/w dry paper sludge.

2. A method according to claim 1, characterized in that the iron-oxide-containing residual materials are, at least in part, scale or mill scale.

3. A method according to claim 1, characterized in that the mixture contains 50 to 95% w/w residual materials.

4. A method according to claim 3, characterized in that the mixture contains 65 to 85% w/w residual materials.

5. A method according to claim 1, characterized in that the grinding is performed simultaneously with the mixing of the residual materials and the paper sludge, using a ball mill or a vibration mill.

6. A method according to claim 5, characterized in that cylindrical grinding elements are used for grinding the residual materials and the paper sludge.

7. A method according to claim 5 or 6, characterized in that the mixture is additionally dried or preheated in the ball mill or the vibration mill.

8. A method according to claim 1, characterized in that the briquetting is carried out at a temperature of between 90 and 250° C.

9. A method according to claim 8, characterized in that the briquetting is carried out at a temperature of between 90 and 150° C.

10. A method according to claim 1, characterized in that the briquetting is carried out at a pressure of between 10 and 500 MPa.

11. A method according to claim 10, characterized in that the briquetting is carried out at a pressure of between 30 and 350 MPa.

12. A method according to claim 11, characterized in that the briquetting is carried out at a pressure of between 100 and 200 MPa.

13. A method according to claim 1, characterized in that one or more components selected from the group consisting of aluminum, copper, manganese, magnesium, silicon, silicon carbide, ferrochrome, ferromanganese, ferrophosphorus, ferrosilicon, ferrosilicon magnesium, ferrotitanium, chromium, nickel, ferronickel, molybdenum, ferromolybdenum, cobalt, ferro-cobalt, zinc oxide, zirconium, tungsten, vanadium and high-speed steel powder are added to the mixture.

14. A method according to claim 1, characterized in that one or more components selected from the group consisting of steel chips, cast steel chips, metal-containing residual materials from smelting operations and metal-containing composite packaging materials are added to the mixture.

* * * * *